(12) United States Patent
Magyar et al.

(10) Patent No.: US 12,088,169 B2
(45) Date of Patent: Sep. 10, 2024

(54) ELECTRIC DRIVE UNIT FOR A MOTOR VEHICLE

(71) Applicant: BPW Bergische Achsen KG, Wiehl (DE)

(72) Inventors: Francisca Magyar, Reichshof (DE); Frank Löhe, Ruppichteroth (DE)

(73) Assignee: BPW Bergische Achsen KG, Wiehl (DE)

( * ) Notice: Subject to any disclaimer, the term of this patent is extended or adjusted under 35 U.S.C. 154(b) by 439 days.

(21) Appl. No.: 17/610,479

(22) PCT Filed: May 6, 2020

(86) PCT No.: PCT/DE2020/100375
§ 371 (c)(1),
(2) Date: Nov. 11, 2021

(87) PCT Pub. No.: WO2020/228897
PCT Pub. Date: Nov. 19, 2020

(65) Prior Publication Data
US 2022/0224187 A1 Jul. 14, 2022

(30) Foreign Application Priority Data

May 15, 2019 (DE) ...................... 10 2019 112 739.4

(51) Int. Cl.
*H02K 5/22* (2006.01)
*B60K 1/02* (2006.01)
(Continued)

(52) U.S. Cl.
CPC ............... *H02K 5/173* (2013.01); *B60K 1/02* (2013.01); *H02K 5/15* (2013.01); *H02K 5/203* (2021.01); *H02K 5/225* (2013.01)

(58) Field of Classification Search
CPC . B60K 1/02; H02K 5/173; H02K 5/15; H02K 5/203; H02K 5/225; H02K 5/1732
See application file for complete search history.

(56) References Cited

U.S. PATENT DOCUMENTS

| 3,937,293 A | 2/1976 | Susdorf |
| 4,429,924 A | 2/1984 | Franz et al. |

(Continued)

FOREIGN PATENT DOCUMENTS

| DE | 78 31 242 | 4/1979 |
| DE | 42 36 093 | 4/1993 |

(Continued)

OTHER PUBLICATIONS

Translation for EP-2969629-B1 (Year: 2014).*

*Primary Examiner* — Bryan R Perez
(74) *Attorney, Agent, or Firm* — Gudrun E. Huckett

(57) ABSTRACT

The invention relates to an electric drive unit for a motor vehicle, having two electric drives (5A, 5B), which are arranged in a housing casing (4) of a common drive housing (3) and each comprise a stator and a rotor (8) rotating together with a rotor shaft (8A, 8B). Adjacent shaft ends (10A, 10B) of the rotor shafts (8A, 8B) are rotatingly mounted in a bearing housing (25), which is the central region of a bearing plate (20) arranged in the drive housing (3). In order to create an electrical drive unit having electric drives arranged one behind the other in a common drive housing, which is compact in the longitudinal direction, without disadvantages with respect to the strength of the drive housing being associated therewith, components of the bearing plate (20) are struts (21, 22, 23) which extend from the bearing housing (25) to the outside and connect the bearing housing (25) to the housing casing (4) of the drive housing (3).

22 Claims, 7 Drawing Sheets

(51) Int. Cl.
*H02K 5/15* (2006.01)
*H02K 5/173* (2006.01)
*H02K 5/20* (2006.01)

(56) References Cited

U.S. PATENT DOCUMENTS

| | | | |
|---|---|---|---|
| 5,419,405 | A | 5/1995 | Kawamoto et al. |
| 5,818,136 | A | 10/1998 | Matsumoto |
| 7,594,757 | B2 | 9/2009 | Verhaegen |
| 10,473,193 | B2 | 11/2019 | Okamoto et al. |
| 2012/0104883 | A1 | 5/2012 | Burns et al. |
| 2015/0270755 | A1 | 9/2015 | Fujimoto et al. |

FOREIGN PATENT DOCUMENTS

| | | | | |
|---|---|---|---|---|
| DE | 10 2006 052 415 | | 5/2008 | |
| DE | 10 2008 061 449 | | 6/2010 | |
| DE | 10 2010 033 269 | | 2/2012 | |
| EP | 2969629 | B1 * | 8/2020 | ............... B60K 1/02 |
| JP | H07288950 | | 10/1995 | |
| JP | S52118505 | | 10/1997 | |
| WO | 98/40958 | | 9/1998 | |

\* cited by examiner

ELECTRIC DRIVE UNIT FOR A MOTOR VEHICLE

BACKGROUND OF THE INVENTION

The invention relates to an electric drive unit, having two electric drives which are arranged in a housing casing of a common drive housing and each comprise a stator and a rotor rotating with a rotor shaft, wherein mutually adjacent shaft ends of the rotor shafts are both rotatably mounted in a bearing housing which is the central region of a bearing plate rigidly arranged in the drive housing.

The invention relates additionally to an electric drive unit, having two electric drives which are arranged in a housing casing of a common drive housing and each comprise a stator and a rotor which rotates with a rotor shaft, wherein mutually adjacent shaft ends of the rotor shafts are both rotatably mounted in a bearing housing which is the central region of a bearing plate rigidly arranged in the drive housing, and wherein a component of the bearing plate is additionally a connecting region which extends outwards from the bearing housing and connects the bearing housing to the housing casing.

From WO 98/40958 there is known an electric drive unit having two electric drives arranged on axes of rotation which are in alignment with one another. Although the two electric drives are located within a housing casing of a common drive housing, they are otherwise independent of one another and accordingly are each provided with their own rotor shaft, the shaft ends of which rotor shafts are guided out of the drive housing facing away from one another. The other, mutually adjacent shaft ends of the rotor shafts are both rotatably mounted in a bearing housing. The bearing housing is the central region of a bearing plate, which is in the form of a round plate and divides the drive housing into a first housing portion having the first electric drive and a second housing portion having the second electric drive.

Since one of the two rotary bearings of the rotor shaft is located at the bearing plate having the bearing housing arranged centrally therein, the bearing plate is correspondingly largely dimensioned, especially since the bearing plate, as well as supporting the shaft forces, also contributes towards the strength of the drive housing. The overall length of the drive housing is therefore determined not only by the dimensions of the electric drive units themselves, but also by the additional installation space occupied by the bearing plate.

The object underlying the invention is to provide an electric drive unit having two electric drives arranged one behind the other in a common drive housing, which drive unit is compact in the longitudinal direction without disadvantages in terms of the strength of the drive housing being associated therewith.

SUMMARY OF THE INVENTION

In order to achieve this object, there is proposed an electric drive unit, having two electric drives which are arranged in a housing casing of a common drive housing and each comprise a stator and a rotor rotating with a rotor shaft, wherein mutually adjacent shaft ends of the rotor shafts are both rotatably mounted in a bearing housing which is the central region of a bearing plate rigidly arranged in the drive housing; the electric drive unit characterized in that components of the bearing plate are struts which extend outwards from the bearing housing and connect the bearing housing to the housing casing of the drive housing having. In this electric drive unit, a closed plate does not serve as the bearing plate, but rather components of the bearing plate are struts which extend outwards from the bearing housing arranged centrally in the bearing plate. These struts together form a connecting region which connects the centrally arranged bearing housing to the housing casing of the drive housing. Since the bearing plate is not a component with an unbroken surface, but rather the connecting region of the bearing plate is formed only of the individual struts, openings and thus voids remain between the struts. The openings provide space, for example, for electrical connections of the electric drives or for cooling measures, and thus space for measures that would otherwise occupy additional installation space in the drive housing. The bearing plate and the bearing housing can be arranged in the drive housing in a form-and force-fitting manner, wherein a one-piece form of a drive housing with a bearing plate and a bearing housing by casting is also possible.

At the same time, it has been found that, for adequate stability of the bearing plate and thus for the required overall strength of the drive housing, it is not necessary for the bearing plate to be in the form of a plate with an unbroken surface. Adequate stiffening and thus a contribution to the overall strength of the drive housing can also be achieved with a bearing plate comprising discrete struts which extend radially outwards from the bearing housing and thus establish the only connection with the surrounding housing casing.

In order to achieve the mentioned object, there is further proposed an electric drive unit, having two electric drives which are arranged in a housing casing of a common drive housing and each comprise a stator and a rotor which rotates with a rotor shaft, wherein mutually adjacent shaft ends of the rotor shafts are both rotatably mounted in a bearing housing which is the central region of a bearing plate rigidly arranged in the drive housing, and wherein a component of the bearing plate is additionally a connecting region which extends outwards from the bearing housing and connects the bearing housing to the housing casing, the electric drive unit characterized by at least one coolant channel which leads from a coolant opening in the housing casing through the connecting region into the bearing housing.

In this electric drive unit too, the mutually adjacent shaft ends of the rotor shafts are both rotatably mounted in a bearing housing which is the central region of a bearing plate rigidly arranged in the drive housing. A portion of the bearing plate forms a connecting region which extends outwards from the bearing housing and connects the bearing housing to the housing casing. In addition to its static, strength-determining function, the connecting region has an additional function inasmuch as a coolant channel leads through it, via which, for example, motor components or also transmission components can be supplied with cooling liquid.

For this purpose, the coolant channel leads, preferably radially, from a coolant opening in the housing casing through the connecting region into the bearing housing. By means of these structural steps, cooling measures which are necessary for the drive unit are relocated into the bearing plate. Space is therefore created in the bearing plate for measures that would otherwise occupy additional installation space in the drive housing.

It is further possible, adapted to the available space, for cooling fins to be formed on the outer surface of the housing casing and/or of the coolant tank, in order to increase the removal of heat from the inside to the outside.

Preferred embodiments of the electric drive units are described in the respective dependent claims.

If the connecting region of the bearing plate consists of individual struts, it is advantageous, in order to achieve openings that are as large as possible between the struts, if the struts only form the outer circumference of the bearing plate and connect the bearing plate to the housing casing of the drive housing with their outer ends. The struts are thus connected to one another only at their inner ends, namely via the bearing housing, and not at their outer ends. The outer ends of the struts are instead connected only to the housing casing of the drive housing.

The connecting region of the bearing plate is preferably formed by three or more struts, which divide an equal number of three or more openings at the bearing plate. The openings preferably have the form of opening segments arranged around the bearing housing.

According to one embodiment, a first opening is located at the bottom in the drive housing. A coolant opening formed at the bottom in the housing casing of the drive housing opens radially into this first opening. In this manner, the coolant opening connects the first opening to a coolant tank arranged in a liquid-tight manner on the outside of the housing casing.

Since the first opening serves only as the mouth of the coolant opening, the first opening can be relatively small. It is therefore proposed that the first opening is smaller than any of the further openings. The further openings are preferably each of the same size.

Through at least one of the struts there runs a coolant channel which leads from a coolant opening, with which the housing casing is provided in a prolongation of the strut, into the bearing housing. It is thus possible to guide coolant via the coolant channel formed in the strut into the region of the bearing housing arranged centrally in the bearing plate, for example in order to supply coolant to the rolling bearings arranged there for the shaft ends of the rotor shafts.

The coolant opening is preferably a threaded bore, the cross section of which is larger than the cross section of the coolant channel running in the strut, wherein a coolant connection piece is screwed into the threaded bore.

With a further embodiment it is proposed that the struts, when seen in the circumferential direction of the bearing plate, are of different widths, and that the width of the strut through which the coolant channel runs is larger than the width of a strut without a coolant channel running therein.

It is further proposed that separate rolling bearings for the shaft ends of the two rotor shafts are arranged in the bearing housing. Each rolling bearing encloses the respective shaft end with its inner ring and is supported in the bearing housing with its outer ring. The bearing housing is provided with a through-opening arranged centrally therein, into which the respective shaft ends extend from both sides and into which the coolant channel opens.

According to a further embodiment, a window is formed in the housing casing in the region of each of two openings of the bearing plate, through which window and through the respective opening electric lines are guided in a space-saving manner to the electric drives.

The windows are preferably arranged on circumferential portions of the housing casing that are remote from one another. The windows are covered on the outside by protective boxes, wherein the protective boxes can be fixed in a modular manner to the drive housing or are cast in one piece with the drive housing. Located in the protective boxes are electrical connectors, to which the electric lines leading to the electric motors are connected. In order to keep the external dimensions of the electric drive unit small, the protective boxes preferably have a main extent parallel to the longitudinal direction of the drive housing.

It is further advantageous for the compact construction of the drive unit if first electric lines lead to a first terminal block which is mounted on the first electric drive and extends into one opening, and if second electric lines lead to a second terminal block which is mounted on the second electric drive and extends into the other opening. The voids provided by the openings in the bearing plate are therefore used to accommodate the terminal blocks of the electric drives in a space-saving manner.

This embodiment is particularly advantageous if the two terminal blocks are arranged on different circumferential portions in the housing casing, and if the terminal blocks extend so far into the respective opening that the terminal blocks overlap partly in the longitudinal direction of the drive housing.

With regard to the connection of the struts to the housing casing of the drive housing, it is proposed that each strut is supported axially against a fin which projects inwards from the housing casing, wherein the fin is welded in that position to the housing casing. The fin is preferably a one-piece component of the housing casing. In another possible embodiment, the housing casing and the bearing plate are manufactured in one piece, for example by casting.

The fin is preferably composed in the circumferential direction of individual, separate fin segments, wherein the fin segments are arranged only on circumferential portions of the housing casing at which the struts are located. This embodiment also contributes to making the opening segments between the fins as large as possible.

The limitation to individual fin segments additionally has the advantage that the housing casing can be provided on the circumferential portions without fin segments, for example, with windows, openings or similar apertures.

The bearing plate is preferably arranged in the drive housing in such a manner that the bearing plate is at the same axial distance from each of the two electric drives.

BRIEF DESCRIPTION OF THE DRAWINGS

Further advantages and details will become apparent from the following description of an exemplary embodiment, wherein reference is made to the drawings. In the drawings.

DESCRIPTION OF PREFERRED EMBODIMENTS

Figure 1:
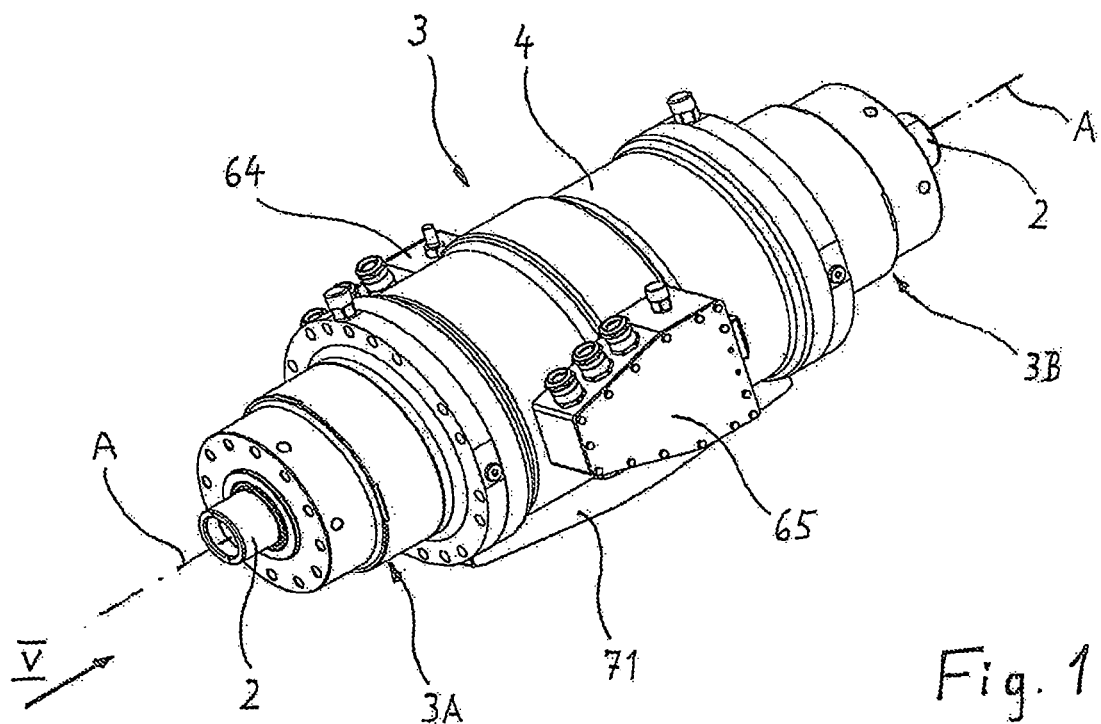
FIG. 1: shows, in a perspective overall view, an electric drive unit fora motor vehicle integrated into a vehicle axle.

FIG. 1 shows, in an overall view, the middle longitudinal portion of an electrically driven vehicle axle. The portions arranged further to the outside of the vehicle on both sides and individual parts of the vehicle axle are not shown. These include, for example, the steering knuckles of the vehicle axle which follow at the outside of the vehicle and on which the wheel hubs with the vehicle wheels are rotatably mounted. Tube portions 2 depicted in FIG. 1 belong in each case to a drive shaft via which the drive torque reaches the respective vehicle wheel.

FIG. 1 shows the middle region of the electric axle, which in terms of housing is composed especially of a drive housing 3, in which two electric drives are located, a first transmission housing 3A at one end of the drive housing 3, and a second transmission housing 3B at the other end of the drive housing 3. In the drive housings 3A, 3B there are located the transmission and preferably planetary gears, via which the power passes from the electric drives 5A, 5B to the drive shafts which are visible at the tube portions 2.

The drive housing 3 consists predominantly of a housing casing 4, which is substantially cylindrical in form. The drive housing 3 is closed at both end faces by flanges screwed thereto. In the exemplary embodiment described here, the flanges are components of the respective transmission housing 3A, 3B.

Figure 2:
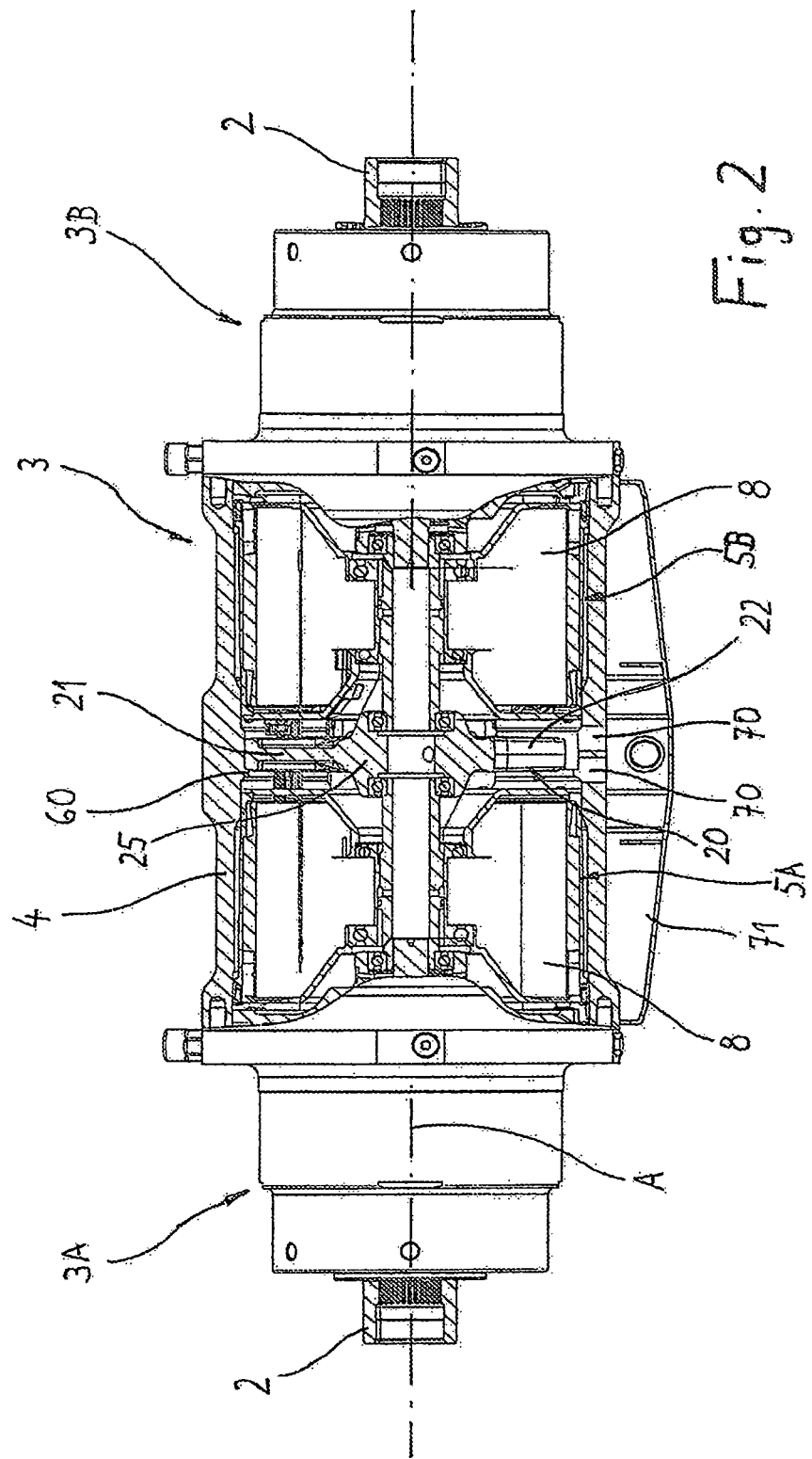
FIG. 2: is a longitudinal view of the drive unit, wherein the central region is depicted as a longitudinal section in a perpendicular sectional plane in FIG. 1.
Figure 3:
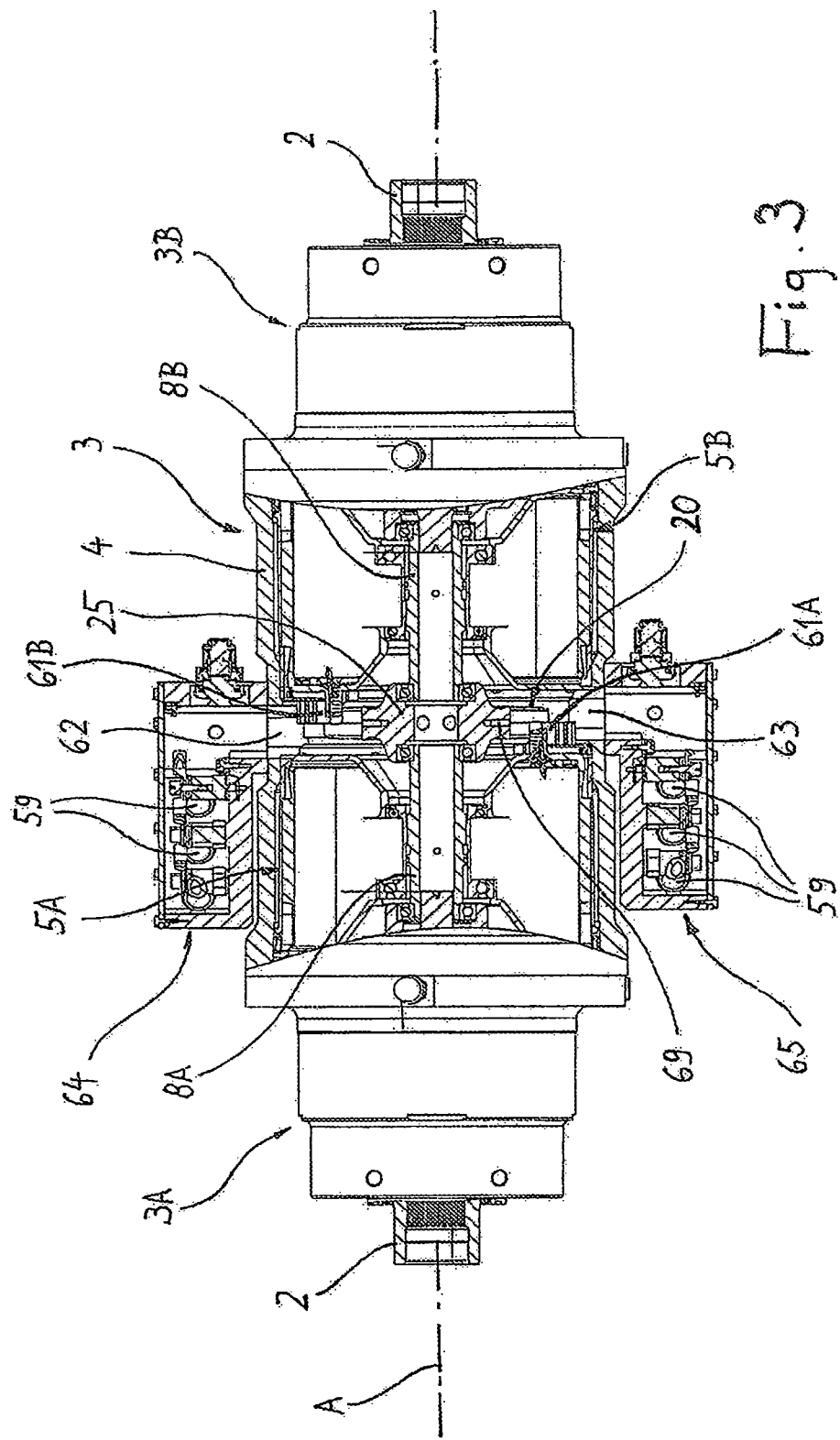
FIG. 3: is a further longitudinal view of the drive unit, wherein the central region is depicted as a longitudinal section in a horizontal sectional plane in FIG. 1.

According to FIG. 2, the interior of the drive housing 3 is substantially in two parts, with a first electric drive 5A occupying one half of the drive housing 3 and a second electric drive 5B occupying the other half of the drive housing 3. The axes of rotation A of the two electric drives 5A, 5B are in alignment, without being coupled with one another. The two electric drives 5A, 5B are therefore located in the housing casing 4 and thus inside the common drive housing 3, but they are otherwise independent of one another and accordingly are each provided with their own drive shaft 8A, 8B. The first shaft ends of the drive shafts lead away from one another to the respective transmission. The two other shaft ends 10A, 10B of the rotor shafts 8A, 8B, that is to say the shaft ends that face one another or are adjacent to one another, are both rotatably mounted, without being mechanically coupled, in a common bearing housing 25.

FIG. 2 further shows the stator of the electric drives 5A, 5B and in each case the rotor 8, which is rotationally fixed with its respective rotor shaft 8A, 8B. The two rotor shafts rotate on the same axis of rotation, that is to say the axes of rotation A of the rotor shafts are in alignment with one another and they both extend in the longitudinal direction of the drive housing 3.

The two electric drives 5A, 5B thus work independently of one another, which does not rule out the possibility that they may be operated, for example, in a synchronized manner.

Precisely in the middle between the two electric motors 5A, 5B there is located in the drive housing 3 a bearing plate 20 arranged transversely to the axes of rotation A. Components of the bearing plate 20 are the bearing housing 25 already mentioned, in which the shaft ends 10A, 10B are rotatably mounted, and a plurality of struts 21, 22, 23. The struts 21, 22, 23 extend preferably radially outwards from the bearing housing 25. The struts 21, 22, 23 together form a connecting region, which rigidly connects the centrally arranged bearing housing 25 to the substantially cylindrical housing casing 4 of the drive housing 3.

The bearing plate 20 has several functions. A first function consists in positioning the bearing housing 25 within the drive housing 3 sufficiently rigidly that the mutually adjacent shaft ends 10A, 10B of the rotor shafts 8A, 8B are rotatably mounted in a defined manner. A further function of the bearing plate 20 consists in contributing to the strength and statics of the drive housing 3. This is in particular because the drive housing 3 is generally tubular in form with open end faces, which are covered only by the transmission housing. A further function of the bearing plate 20 consists in accommodating coolant channels via which cooling liquid can reach the drive components in particular.

Figure 6:
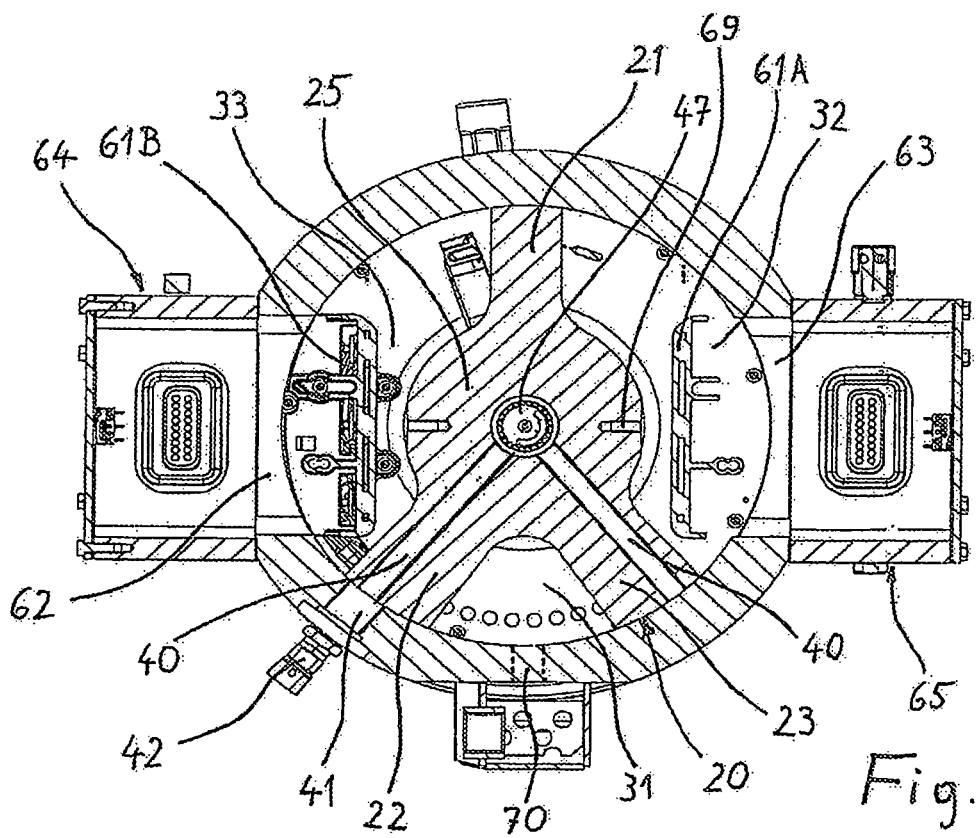
FIG. 6: shows a cross section through the electric drive unit in the region of the bearing plate.
Figure 7:
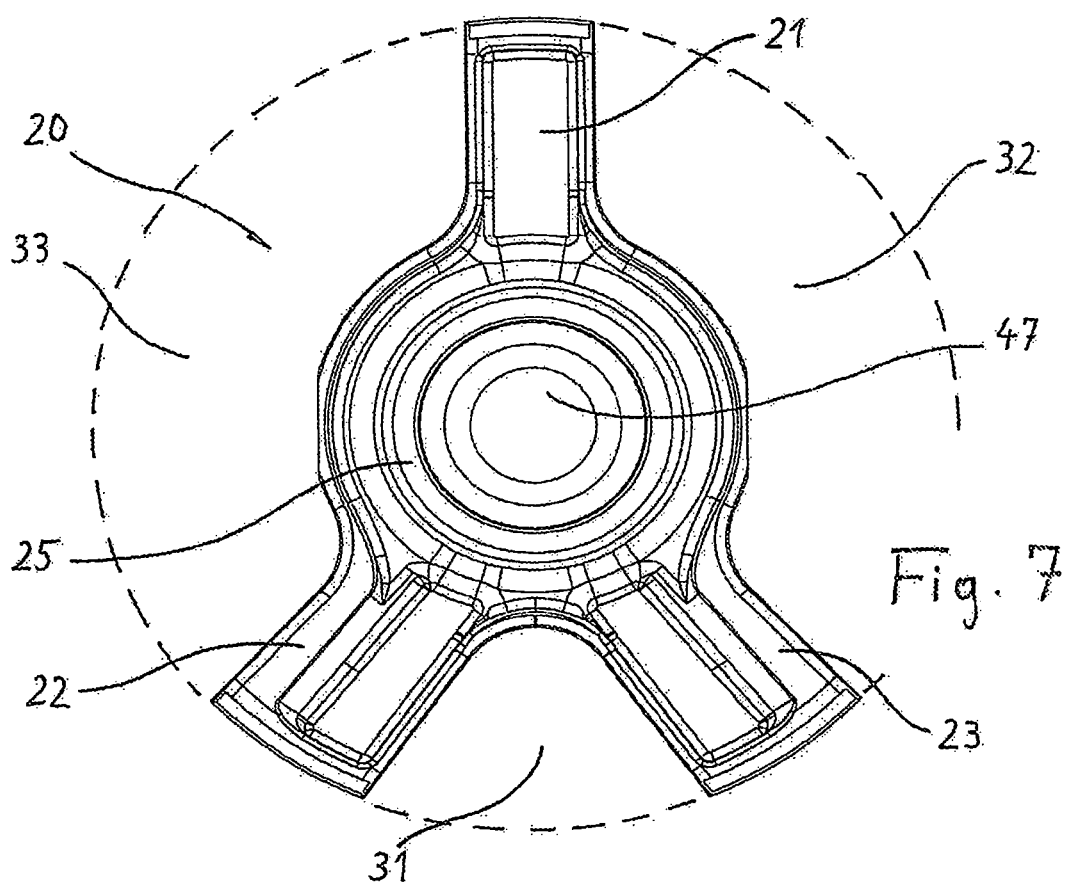
FIG. 7: shows a detail of the bearing plate.
Figure 8:
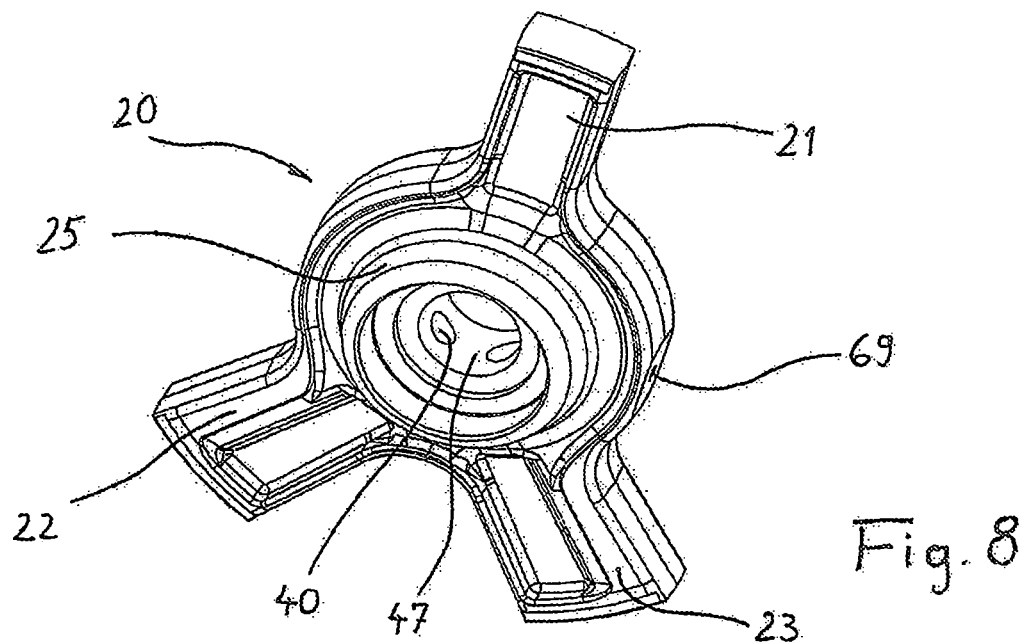
FIG. 8: shows a further detail of the bearing plate, here in a perspective view.

According to FIGS. 6-8, the bearing plate 20 is not a closed plate, but rather the bearing plate 20 consists especially of the struts 21, 22, 23 already mentioned, which extend preferably radially outwards from the bearing housing 25 arranged centrally in the bearing plate 20. Only the discrete struts 21, 22, 23 form the connecting region via which the bearing housing 25 is connected to the housing casing 4.

Because the bearing plate 20 is not a component with an unbroken surface, an equal number of openings 31, 32, 33, and thus voids, remain between the struts. The openings 31, 32, 33, or voids, provide space for cooling measures and for accommodating electrical terminal blocks. They thus provide space in particular for measures that would otherwise occupy additional installation space in the drive housing 3.

For the stability of the bearing plate 20 and thus the required strength of the drive housing 3, it is also not necessary that the bearing plate 20 is a plate with an unbroken surface. The bearing plate 20 with a connecting region of discrete struts 21, 22, 23 also permits sufficient stiffening and thus contributes to the strength of the drive housing 3 overall.

According to FIGS. 6-8, the bearing plate 20 preferably has three struts 21, 22, 23 in total. These are so arranged relative to one another that, when viewed along the axis of rotation A, they together depict an upside-down "Y". This is because the angular distance between the two struts 22, 23 is smaller than the angular distance of each of these two struts 22, 23 from the strut 21. Hereinbelow, the strut 21, which extends upwards when the drive axle is mounted in the vehicle, will be referred to as the first strut, and the struts 22 and 23 that point obliquely downwards in the vehicle will be referred to as the second and third strut.

Between the second strut 22 and the third strut 23 there is a first opening 31 in the form of an opening segment. Between the first strut 21 and the second strut 22 there is an opening 33 likewise in the form of an opening segment. Between the first strut 21 and the third strut 23 there is an opening 32 likewise in the form of an opening segment.

In the exemplary embodiment, the openings, or opening segments, 32, 33 are of the same size, whereas the opening 31 that is at the bottom when the vehicle axle is mounted has a smaller opening area because of the smaller angle between the struts 22, 23.

The struts 21, 22, 23 are of different widths in the circumferential direction of the bearing plate. The width of the two struts 22, 23, through each of which a coolant channel 40 runs, is larger than the width of the first strut 21, through which a coolant channel does not run. Such cross sections of the struts in which a coolant channel 40 does not run can additionally be of smaller thickness. For example, the struts of cross sections that are not used for cooling purposes can be provided with weight-reducing recesses.

The coolant channel 40 running in the strut 22 and/or in the strut 23 extends from the bearing housing 25, into the interior of which it opens, to a coolant opening 41 with which the housing casing 4 is provided in a prolongation of the strut. The coolant opening 41 is a threaded bore radially in the housing casing 4. The cross section of the coolant opening 41 is larger than the cross section of the coolant channel 40 running in the strut 22, 23, so that a coolant connection piece 42 can be screwed into the threaded bore without any loss of coolant pressure. Coolant is fed in via the coolant connection piece 42 and then passes via the coolant channel 40 into the center of the bearing housing 25 in order to cool the rolling bearings 45A, 45B of the rotor shafts arranged there.

The bearing housing 25 is wider, in the longitudinal direction of the drive housing 3, than the width, or thickness, of the struts 21, 22, 23. The bearing housing 25 is provided on the axis of rotation A with a through-opening 47, which is composed of a plurality of longitudinal portions. The two outer longitudinal portions of the through-opening 47 are bearing seats, in which there are seated the outer rings of the rolling bearings 45A 45B in which the rotor shafts 8A, 8B are mounted. The coolant channel 40 opens in the middle longitudinal portion of the through-opening 47. Between the mentioned longitudinal portions there is in each case a further, short longitudinal portion which serves as a coolant feed to the rolling bearings 45A and 45B. Via this coolant feed, which opens in each case between the inner ring and the outer ring of the rolling bearings 45A, 45B, a portion of the coolant flowing via the coolant channel 40 into the through-opening 47 enters the region of the rolling elements of the rolling bearings 45A, 45B.

Figure 4:
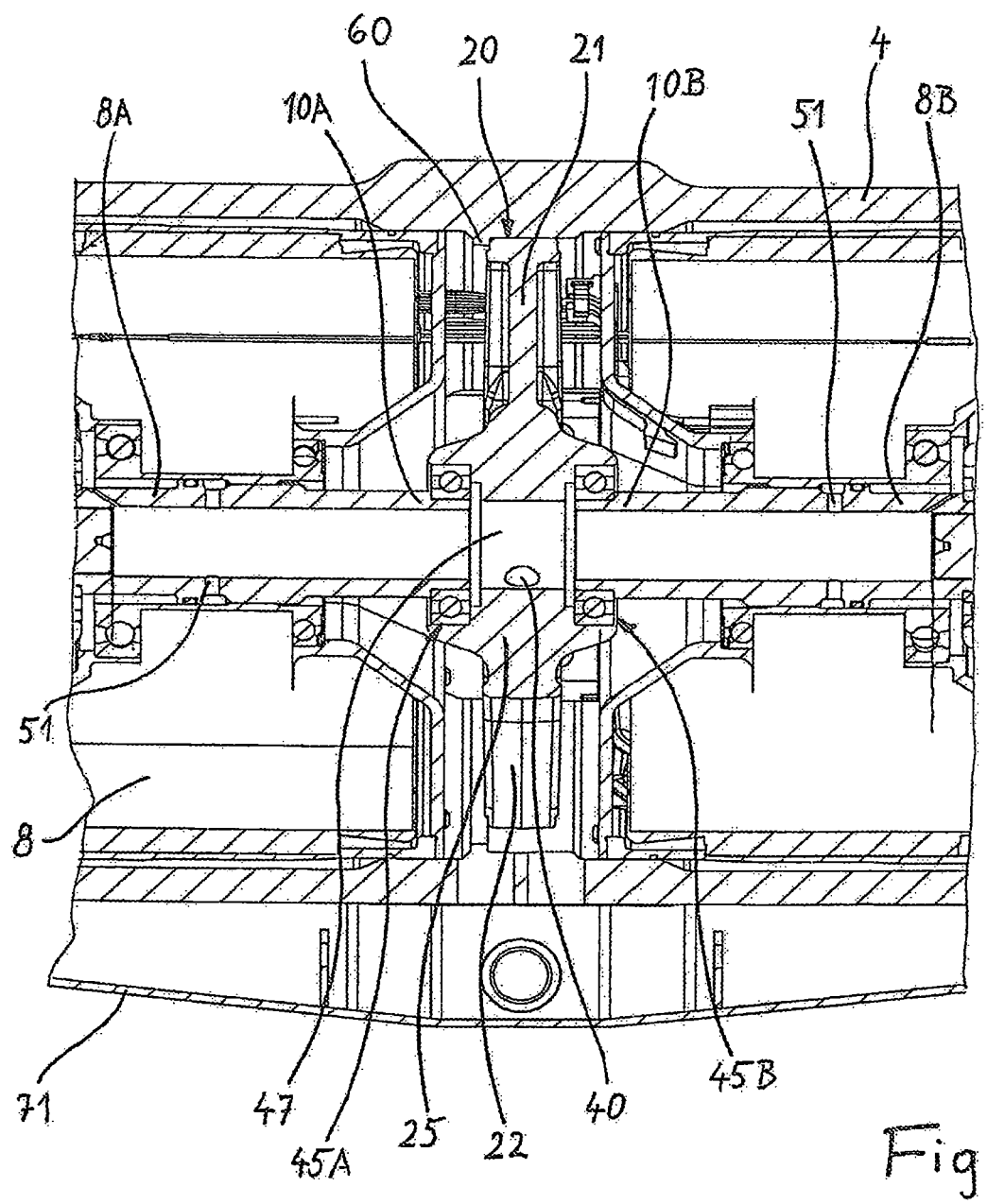
FIG. 4: shows, in an enlarged view compared to FIG. 2, the central region of the electric drive unit including a bearing plate arranged there.
Figure 5:
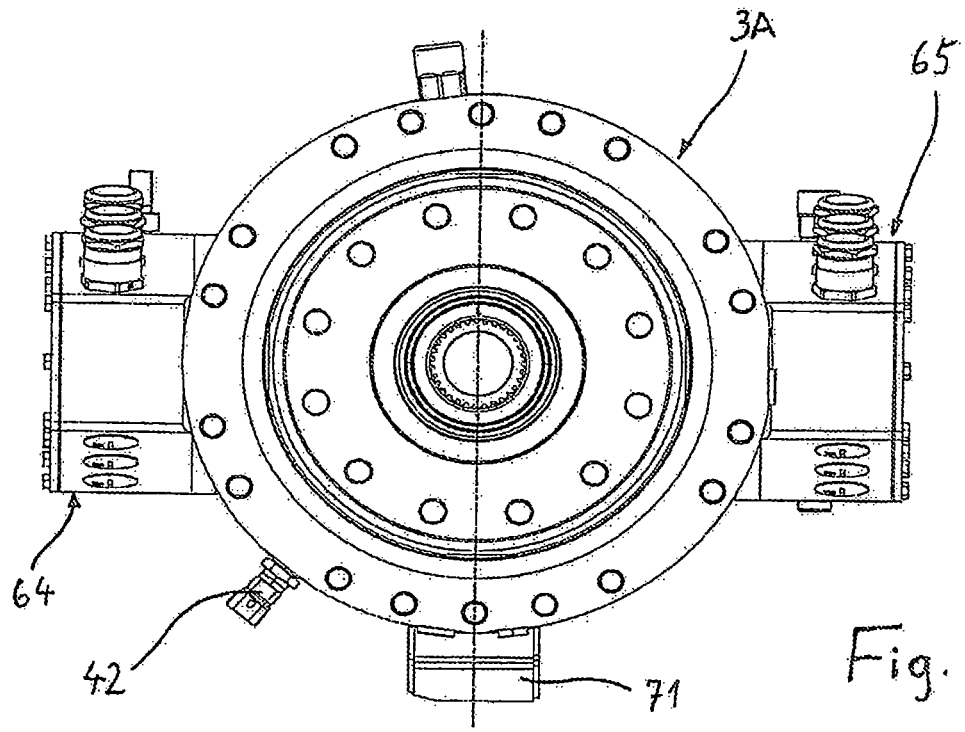
FIG. 5: shows the electric drive unit from viewing direction V indicated in FIG. 1.

According to FIG. 4, the two rotor shafts 8A, 8B are hollow shafts over at least a portion of their length, which hollow shafts are open facing one another. Another portion of the coolant flowing via the coolant channel 40 into the through-opening 47 can therefore flow into the rotor shafts 8A, 8B and from there, via transverse bores 51 formed in the rotor shafts 8A, 8B, into the rotor 8 of the respective electric drive.

For bracing the drive housing 3, the struts 21, 22, 23 are supported with their outer ends radially against the housing casing 4. In addition, each strut 21, 22, 23 is supported axially against a fin 60, which is formed in one piece inside the housing casing 4. By means of the axial support against the fin 60, the longitudinal position of the bearing plate 20 inside the drive housing 3 is clearly defined.

However, the fin 60 is here not a continuous fin over the entire circumference of the housing casing 4 but is composed in the circumferential direction of individual, separate fin segments. The fin segments are preferably located only on those circumferential portions of the housing casing 4 at which the outer ends of the struts 21, 22, 23 are located.

Since the fin 60 is composed of individual fin segments, the housing casing 4 can be provided on the circumferential portions without fin segments with, for example, windows, openings or similar apertures. In the exemplary embodiment, this is used to form a window 62, 63 in the housing casing in the region of the second opening 32 and in the region of the third opening 33.

Electric lines lead through the window 62, 63 and through the second opening 62 or the third opening 63 to terminal blocks 61A, 61B of the electric drives 5A, 5B. The two terminal blocks 61A, 61B are arranged inside the housing casing 4 on different, namely mutually opposite, circumferential portions. Accordingly, the two windows 62, 63 are also formed in the housing casing 4 on mutually opposite circumferential portions.

On the outside, the windows 62, 63 are each covered by a protective box 64, 65. In the protective box 65 there are electrical connectors 59, from which electric lines lead to the terminal block 61A of the first electric drive 5A. The earth conductor of the electric line is contacted in a threaded hole 69 of the bearing housing 25. In the other protective box 64 too there are electrical connectors 59, from which electric lines lead to the terminal block 61B of the second electric drive 5B. Again, the earth conductor of the electric line is contacted in a threaded hole in the bearing housing 25.

The terminal block 61A of the first electric drive 5A extends into the opening 32, and the terminal block 61 B of the second electric drive 5A extends into the opening 33. For a particularly compact arrangement, the two terminal blocks 61A, 61B extend so far into the respective openings 32, 33 that the terminal blocks 61A, 61B overlap partly in the longitudinal direction of the drive housing 3.

In order to keep the electric drive unit within the surrounding vehicle compact, the protective boxes 64, 65 are in such a form that the main extent of the protective boxes 64, 65 is parallel to the axes of rotation A (FIG. 1). The protective boxes 64, 65 preferably extend in one direction, so that electrical connecting cables can be laid on only one side of the vehicle.

On the longitudinal portion of the drive housing 3 on which the bearing plate 20 is located, the housing casing 4 is provided at its lowermost point with one or with a plurality of coolant openings 70. Owing to this position of the coolant opening 70, the coolant opening connects the first opening 31 arranged between the struts 22, 23 to a coolant tank 71 arranged on the outside of the housing casing 4. Coolant can therefore flow off via the coolant opening 70 into the coolant tank 71 arranged at the lowermost point of the drive unit, where it can collect.

There is suitable as the coolant, since it also flows through parts of the electric motors, especially a cooling oil. This should have a specification such that it additionally has good lubricating properties in the lubrication of the rolling bearings 45A, 45B and of the further rolling bearings of the drive unit.

Figure 9:
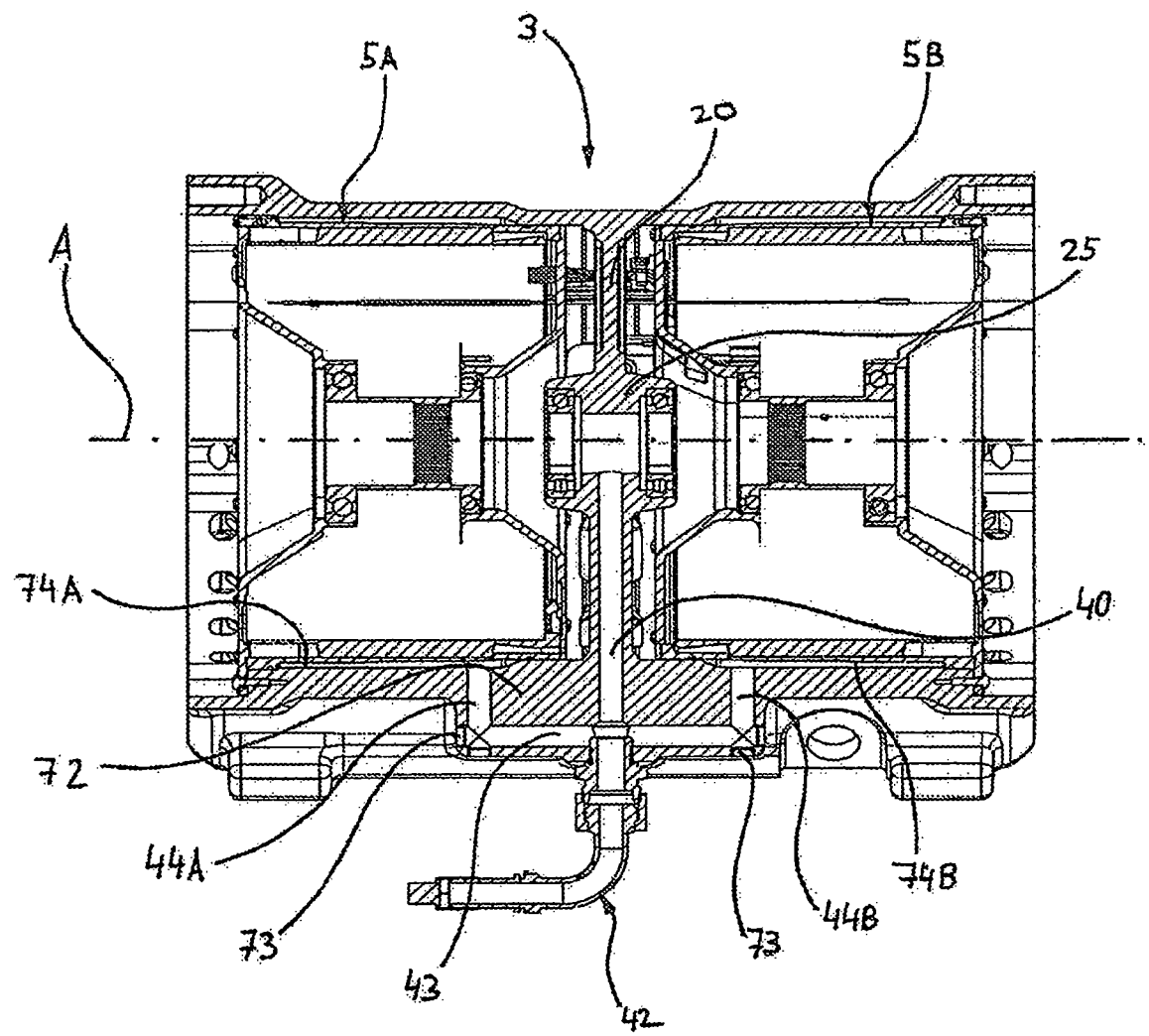
FIG. 9: is a longitudinal view of a second embodiment of the drive unit, wherein the central region is depicted as a longitudinal section in a perpendicular sectional plane.

FIG. 9 shows a second embodiment of the drive housing 3, wherein the rotor shafts are not shown in this drawing. According to FIG. 9, the bearing plate 20, the bearing housing 25 and the drive housing 3 are produced in one piece by casting, wherein their structural design is the same as the multipart system according to FIGS. 2 to 6 in the assembled state.

There is further formed on the outside of the drive housing 3, in the region of the coolant channel 40, a distributor block 72, wherein the distributor block 72 is also formed in one piece on the drive housing 3. The distributor block 72 has, in addition to the coolant channel 40, also three further bores, wherein the first bore 43 runs through the distributor block 72 parallel to the axis of rotation A. The second and third bores 44A, 44B extend in parallel to the left and right of the coolant channel 40, wherein they intersect the first bore 43 and pass through the outside wall of the drive housing 3. For manufacturing reasons, the first, second and third bores 43, 44A, 44B are in the form of through-bores, wherein the bore openings on the outer side of the distributor block 72 are subsequently closed tightly by plugs 73.

The first, second and third bores 43, 44A, 44B are adapted to remove coolant from the coolant channel 40 and divert it into an annular gap 74A, 74B which surrounds the stator externally. Via access openings, not shown, which surround the stator in an annular manner, the coolant is guided into the interior of the electric drive 5A, 5B, wherein it is again fed via a coolant opening, not shown, to the coolant tank, likewise not shown. Additional cooling of the electric drive unit is thus made possible.

LIST OF REFERENCE SIGNS 2 tube portion
3 drive housing
3A transmission housing
3B transmission housing
4 housing casing
5A electric drive
5B electric drive
8 rotor
8A rotor shaft
8B rotor shaft
10A shaft end
10B shaft end
20 bearing plate
21 strut
22 strut
23 strut
25 bearing housing
31 opening
32 opening
33 opening
40 coolant channel
41 coolant opening
42 coolant connection piece
43 first bore
44A second bore
44B third bore
45A rolling bearing
45B rolling bearing
47 through-opening
51 transverse bore
59 connector
60 fin
61A terminal block
61B terminal block
62 window
63 window
64 protective box
65 protective box
68 electric line
69 threaded hole for earth conductor
70 coolant opening
71 coolant tank
72 distributor block
73 plug
74A annular gap
74B annular gap
A axis of rotation

What is claimed is:

1. An electric drive unit for a motor vehicle, the electric drive unit comprising:
a common drive housing (3) comprising a housing casing (4);
a bearing plate (20) rigidly arranged in the drive housing (3) and comprising a central bearing housing (25);
a first electric drive and a second electric drive (5A, 5B) arranged in the housing casing (4), the first and the second electric drives (5A, 5B) each comprising a stator and a rotor (8) mounted on a rotor shaft (8A, 8B), wherein the rotor shafts (8A, 8B) each comprise a shaft end (10A, 10B) rotatably mounted in the central bearing housing (25);
wherein the bearing plate (20) further comprises struts (21, 22, 23) connected to the central bearing housing (25) and extending outwardly away from the central bearing housing (25), wherein the struts (21, 22, 23) connect the central bearing housing (25) to the housing casing (4);
wherein the struts include three or more struts (21, 22, 23) defining three or more openings (31, 32, 33) in the form of opening segments at the bearing plate (20), wherein the opening segments are arranged around the bearing housing (25);
wherein the three or more openings (31, 32, 33) include a first opening (31) located at a bottom of the drive housing (3), and wherein the first opening (31) is the smallest one of the three or more openings (32, 33).

2. The electric drive unit as claimed in claim 1, wherein only the struts (21, 22, 23) form an outer circumference of the bearing plate (20) and comprise outer ends connecting the bearing plate (20) to the housing casing (4).

3. The electric drive unit as claimed in claim 1, further comprising a coolant opening (70) formed in a bottom of the housing casing (4) of the drive housing (3) and opening radially into the first opening (31).

4. The electric drive unit as claimed in claim 3, further comprising a coolant tank (71) arranged externally on the housing casing (4), wherein the coolant opening (70) connects the first opening (31) to the coolant tank (71).

5. The electric drive unit as claimed in claim 1, wherein the three or more openings (32, 33), except the first opening (31), are of the same size.

6. The electric drive unit as claimed in claim 1, wherein the bearing plate (20) is arranged in the drive housing (3) such that the bearing plate (20) is arranged at a same axial distance from the first electric drive and from the second electric drive (5A, 5B).

7. The electric drive unit as claimed in claim 1, wherein the rotor shafts (8A, 8B) each have an axis of rotation (A), wherein the axes of rotation (A) are in alignment with one another.

8. The electric drive unit as claimed in claim 1, wherein the struts include a first strut (22, 23) comprising a coolant channel (40), wherein the coolant channel (40) leads from a coolant opening (41) of the housing casing (4) in a prolongation of the first strut (22, 23) into the bearing housing (25).

9. An electric drive unit for a motor vehicle, the electric drive unit comprising;
a common drive housing (3) comprising a housing casing (4);
a bearing plate (20) rigidly arranged in the drive housing (3) and comprising a central bearing housing (25);
a first electric drive and a second electric drive (5A, 5B) arranged in the housing casing (4), the first and the second electric drives (5A, 5B) each comprising a stator and a rotor (8) mounted on a rotor shaft (8A, 8B), wherein the rotor shafts (8A, 8B) each comprise a shaft end (10A, 10B) rotatably mounted in the central bearing housing (25);
wherein the bearing plate (20) further comprises struts (21, 22, 23) connected to the central bearing housing (25) and extending outwardly away from the central bearing housing (25), wherein the struts (21, 22, 23) connect the central bearing housing (25) to the housing casing (4), wherein the struts include three or more struts (21, 22, 23) defining three or more openings (31, 32, 33) in the form of opening segments at the bearing plate (20), wherein the opening segments are arranged around the bearing housing (25);

wherein the three or more openings include a first opening and a second opening, wherein the first and second openings each have associated therewith a window (62, 63) provided in the housing casing (4), wherein through the first and second openings (32, 33) and the associated windows (62, 63) electric lines are guided to the first and second electric drives (5A, 5B).

10. The electric drive unit as claimed in claim 9, further comprising protective boxes (64, 65) comprising electrical connectors (59) to which the electric lines are connected, wherein the windows (62, 63) are provided on circumferential portions of the housing casing (4) that are remote from one another, wherein the windows (62, 63) are covered by the protective boxes (64, 65) arranged externally on the housing casing (4).

11. The electric drive unit as claimed in claim 10, wherein a main extent of the protective boxes (64, 65) is parallel to a longitudinal direction of the drive housing (3).

12. The electric drive unit as claimed in claim 9, wherein the electric lines include first electric lines leading to a first terminal block (61A) mounted on the first electric drive (5A) and further include second electric lines leading to a second terminal block (61B) mounted on the second electric drive (5B), wherein the first electric lines extend into the first opening (32) and the second electric lines extend into the second opening (33).

13. The electric drive unit as claimed in claim 12, wherein the first terminal block (61A) extends so far into the first opening (32) and the second terminal block (61B) extends so far into the second opening (33) that the first and second terminal blocks (61A, 61B) overlap partly in a longitudinal direction of the drive housing (3).

14. An electric drive unit for a motor vehicle, the electric drive unit comprising:
- a common drive housing (3) comprising a housing casing (4);
- a bearing plate (20) rigidly arranged in the drive housing (3) and comprising a central bearing housing (25);
- a first electric drive and a second electric drive (5A, 5B) arranged in the housing casing (4), the first and the second electric drives (5A, 5B) each comprising a stator and a rotor (8) mounted on a rotor shaft (8A, 8B), wherein the rotor shafts (8A, 8B) each comprise a shaft end (10A, 10B) rotatably mounted in the central bearing housing (25);
- wherein the bearing plate (20) further comprises struts (21, 22, 23) connected to the central bearing housing (25) and extending outwardly away from the central bearing housing (25), wherein the struts (21, 22, 23) connect the central bearing housing (25) to the housing casing (4);
- wherein the housing casing (4) comprises a fin (60) projecting inwardly toward the bearing housing (25), wherein the struts (21, 22, 23) are supported axially at the fin (60).

15. The electric drive unit as claimed in claim 14, wherein the fin (60) is a one-piece component of the housing casing (4).

16. The electric drive unit as claimed in claim 14, wherein the fin (60) is comprised, in a circumferential direction of the housing casing (4), of individual, separate fin segments, and wherein the fin segments are arranged only at first circumferential portions of the housing casing (4) where the struts (21, 22, 23) are located.

17. The electric drive unit as claimed in claim 16, wherein the housing casing (4) comprises second circumferential portions without fin segments, wherein the second circumferential portions without fin segments are provided with windows (62, 63) or openings.

18. An electric drive unit for a motor vehicle, the electric drive unit comprising:
- a common drive housing (3) comprising a housing casing (4);
- a bearing plate (20) rigidly arranged in the drive housing (3) and comprising a central bearing housing (25);
- a first electric drive and a second electric drive (5A, 5B) arranged in the housing casing (4), the first and the second electric drives (5A, 5B) each comprising a stator and a rotor (8) mounted on a rotor shaft (8A, 8B), wherein the rotor shafts (8A, 8B) each comprise a shaft end (10A, 10B) rotatably mounted in the central bearing housing (25);
- wherein the bearing plate (20) further comprises a connecting region extending outwardly from the bearing housing (25) and connecting the bearing housing (25) to the housing casing (4):
- at least one coolant channel (40) leading from a coolant opening (41) in the housing casing (4) through the connecting region into the bearing housing (25);
- a coolant connection piece (42), wherein the coolant opening (41) is a threaded bore and the coolant connection piece (42) is screwed into the threaded bore, wherein the threaded bore comprises a cross section larger than a cross section of the coolant channel (40).

19. The electric drive unit as claimed in claim 18, wherein the coolant channel (40) leads radially through the connecting region.

20. An electric drive unit for a motor vehicle, the electric drive unit comprising:
- a common drive housing (3) comprising a housing casing (4);
- a bearing plate (20) rigidly arranged in the drive housing (3) and comprising a central bearing housing (25);
- a first electric drive and a second electric drive (5A, 5B) arranged in the housing casing (4), the first and the second electric drives (5A, 5B) each comprising a stator and a rotor (8) mounted on a rotor shaft (8A, 8B), wherein the rotor shafts (8A, 8B) each comprise a shaft end (10A, 10B) rotatably mounted in the central bearing housing (25);
- wherein the bearing plate (20) further comprises struts (21, 22, 23) connected to the central bearing housing (25) and extending outwardly away from the central bearing housing (25), wherein the struts (21, 22, 23) connect the central bearing housing (25) to the housing casing (4), wherein the struts include a first strut (22, 23) comprising a coolant channel (40), wherein the coolant channel (40) leads from a coolant opening (41) of the housing casing (4) in a prolongation of the first strut (22, 23) into the bearing housing (25);
- further comprising a coolant connection piece (42), wherein the coolant opening (41) is a threaded bore and the coolant connection piece (42) is screwed into the threaded bore, wherein the threaded bore comprises a cross section larger than a cross section of the coolant channel (40).

21. An electric drive unit for a motor vehicle, the electric drive unit comprising:
- a common drive housing (3) comprising a housing casing (4);
- a bearing plate (20) rigidly arranged in the drive housing (3) and comprising a central bearing housing (25);
- a first electric drive and a second electric drive (5A, 5B) arranged in the housing casing (4), the first and the second electric drives (5A, 5B) each comprising a stator and a rotor (8) mounted on a rotor shaft (8A, 8B), wherein the rotor shafts (8A, 8B) each comprise a shaft end (10A, 10B) rotatably mounted in the central bearing housing (25);

wherein the bearing plate (20) further comprises struts (21, 22, 23) connected to the central bearing housing (25) and extending outwardly away from the central bearing housing (25), wherein the struts (21, 22, 23) connect the central bearing housing (25) to the housing casing (4), wherein the struts include a first strut (22, 23) comprising a coolant channel (40), wherein the coolant channel (40) leads from a coolant opening (41) of the housing casing (4) in a prolongation of the first strut (22, 23) into the bearing housing (25);

wherein the struts include a second strut without a coolant channel, wherein the first strut (22, 23) has a first width, viewed in a circumferential direction of the bearing plate (20), and the second strut has a second width, viewed in a circumferential direction of the bearing plate (20), wherein the first width is larger than the second width.

22. An electric drive unit for a motor vehicle, the electric drive unit comprising:

a common drive housing (3) comprising a housing casing (4);

a bearing plate (20) rigidly arranged in the drive housing (3) and comprising a central bearing housing (25);

a first electric drive and a second electric drive (5A, 5B) arranged in the housing casing (4), the first and the second electric drives (5A, 5B) each comprising a stator and a rotor (8) mounted on a rotor shaft (8A, 8B), wherein the rotor shafts (8A, 8B) each comprise a shaft end (10A, 10B) rotatably mounted in the central bearing housing (25);

wherein the bearing plate (20) further comprises struts (21, 22, 23) connected to the central bearing housing (25) and extending outwardly away from the central bearing housing (25), wherein the struts (21, 22, 23) connect the central bearing housing (25) to the housing casing (4), wherein the struts include a first strut (22, 23) comprising a coolant channel (40), wherein the coolant channel (40) leads from a coolant opening (41) of the housing casing (4) in a prolongation of the first strut (22, 23) into the bearing housing (25);

further comprising separate rolling bearings (45A, 45B) for the shaft ends (10A, 10B) of the two rotor shafts (8A, 8B) arranged in the bearing housing (25), wherein the rolling bearings (45A, 45B) each comprise an inner ring enclosing the respective shaft end (10A, 10B) and further comprising an outer ring supported in the bearing housing (25), and wherein the bearing housing (25) comprises a through-opening (47) arranged centrally therein, wherein the shaft ends (10A, 10B) extend into the through-opening (47), and wherein the coolant channel (40) opens into the through-opening (47).

* * * * *